(12) United States Patent
Bruun et al.

(10) Patent No.: US 6,430,257 B1
(45) Date of Patent: Aug. 6, 2002

(54) METHOD AND APPARATUS FOR DETERMINING THE POSITION OF AN ELONGATED OBJECT RELATIVE THE SURFACE OF AN OBSTRUCTING BODY BY MEANS OF ELECTROMAGNETIC RADIATION

(75) Inventors: Nikolaj Bruun, Brönshöj (DK); Jan Lundgren, Grundsund (SE); Steen Teller, Birkeröd; Thomas Aaboe Jensen, Alleröd, both of (DK)

(73) Assignees: Volvo Aero Corporation, Trollhättan (SE); FORCE Instituttet, Bröndby (DK)

( * ) Notice: Subject to any disclaimer, the term of this patent is extended or adjusted under 35 U.S.C. 154(b) by 0 days.

(21) Appl. No.: 09/646,319
(22) PCT Filed: Jan. 12, 2000
(86) PCT No.: PCT/SE00/00032

§ 371 (c)(1),
(2), (4) Date: Nov. 21, 2000

(87) PCT Pub. No.: WO00/41838

PCT Pub. Date: Jul. 20, 2000

(30) Foreign Application Priority Data

Jan. 15, 1999 (SE) .............................................. 9900109

(51) Int. Cl.⁷ ............................................ G01N 23/201
(52) U.S. Cl. ......................................... 378/86; 378/89
(58) Field of Search ............................. 378/86, 87, 89, 378/90

(56) References Cited

U.S. PATENT DOCUMENTS

| | | | | |
|---|---|---|---|---|
| 4,495,636 A | * | 1/1985 | Jacobs et al. | ................. 378/87 |
| 4,821,304 A | * | 4/1989 | Danos | .................... 250/505.1 |
| 4,905,263 A | * | 2/1990 | Larsson et al. | .......... 250/360.1 |
| 5,195,116 A | * | 3/1993 | Le Floc'h et al. | ............. 378/86 |
| 5,600,700 A | * | 2/1997 | Krug et al. | .................. 376/159 |
| 5,648,619 A | * | 7/1997 | Gustafsson et al. | ......... 73/865.8 |

FOREIGN PATENT DOCUMENTS

| | | |
|---|---|---|
| DE | 4203887 | 8/1993 |
| EP | 0348574 | 1/1990 |
| EP | 0708326 | 4/1996 |
| GB | 2055198 | 2/1981 |
| JP | 6074740 | 3/1994 |
| JP | 11-47986 | 2/1999 |
| WO | 9500725 | 1/1995 |
| WO | WO 95/00725 | * 1/1995 |

\* cited by examiner

*Primary Examiner*—David P. Porta
(74) *Attorney, Agent, or Firm*—Dickstein Shapiro Morin & Oshinsky

(57) ABSTRACT

The invention refers to a method for determining the position of an elongated narrow object relative the surface of an obstructing disk-like body in front of said object and oriented at an angle thereto, by means of electromagnetic ionizing radiation, for guidance of the movement of an associated laser welding equipment For providing the carrying out of this method with high speed and greatest precision when manufacturing sandwich elements with conical or double-curved surface it is suggested according to the invention that from the side of the body remote from the object is directed, under approximate movement in the longitudinal direction of the object one precisely collimated radiation beam obliquely to the object under simultaneous scanning motion at right angles thereto, that the radiation back-scattered from the object is collected at the same side of the body and is brought to form a signal which is compared with memory-stored predetermined preference signals for the desired correct position of the object relative the body. The invention also suggests a device for carrying out this method.

6 Claims, 2 Drawing Sheets

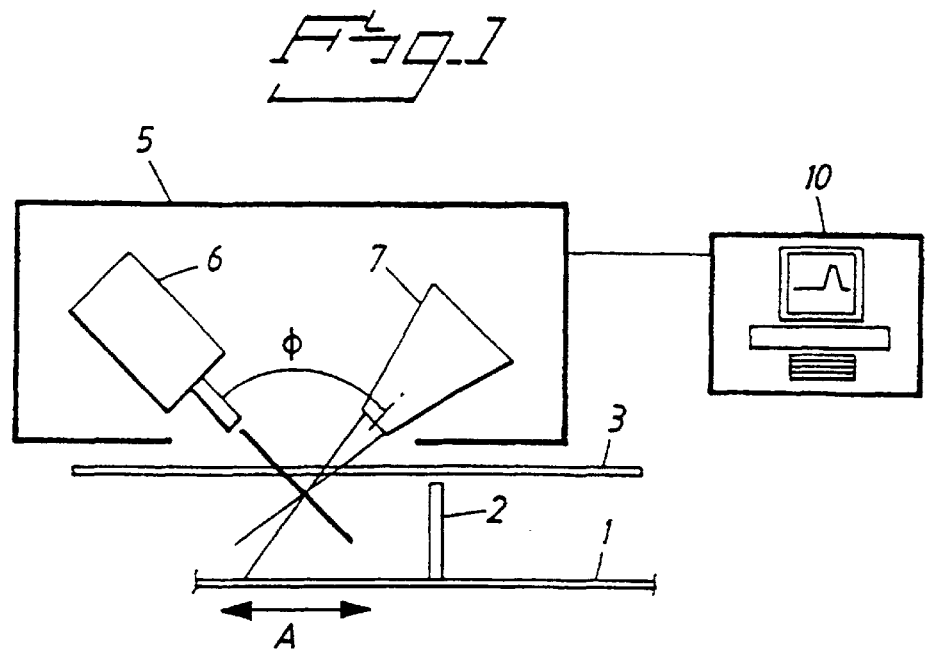
Fig. 1
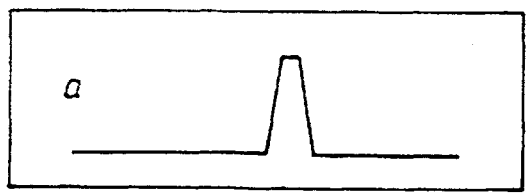
Fig. 2.1
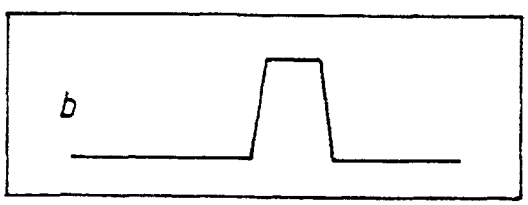
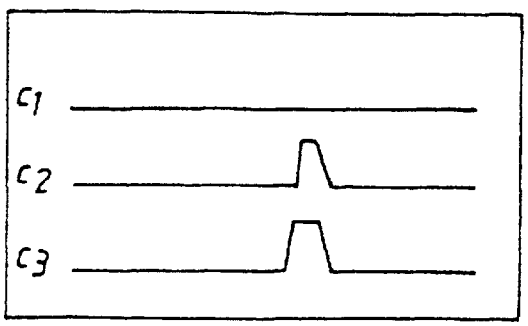
Fig. 2.2

METHOD AND APPARATUS FOR DETERMINING THE POSITION OF AN ELONGATED OBJECT RELATIVE THE SURFACE OF AN OBSTRUCTING BODY BY MEANS OF ELECTROMAGNETIC RADIATION

BACKGROUND OF THE INVENTION

The present invention refers to a method and apparatus for determining the position of an elongated, relatively narrow object relative to the surface of an obstructing, preferably disk-like body in front of said object and oriented at an angle thereto, and, more particularly, to such a method and apparatus which employs electromagnetic radiation, particularly ionizing radiation, for guidance of the movement of an associated treatment equipment, particularly for laser welding.

Previously, electromagnetic radiation has been used for finding hidden materials, such as narcotics, explosives and other contraband etc. One example is disclosed in GB-A-2 055 198. Other examples are disclosed in U.S. Pat. No. 5,600,700 and U.S. Pat. No. 5,648,619.

WO 95/00725 describes the manufacture of a so-called sandwich element, i.e., a double-walled sheet metal element, particularly for use in the manufacture of ships. However, it is not evident from WO 95/00725 how this manufacture including welding of the spacing walls of this element is to be carried out. Further, WO 95/00725 deals with plane sheet metal walls having standardized and, preferably, right-angular shapes, which makes the problem simple.

Another and more difficult problem occurs when sandwich elements are to be made, which have conical or double-curved surface, such as in rocket nozzles or the like. Then very high requirements as to precision are required when it comes to welding through the obstructing sheet wall against the narrow side or edge of the spacing means, the width of which is less than 1 mm.

SUMMARY OF THE INVENTION

Therefore, the main object of the present invention is to solve this problem and this is achieved by means of a method according to the invention, which is substantially distinguished in that from the side of the body remote from the object is directed, under approximate movement in the longitudinal direction of the object, at least one precisely collimated radiation beam obliquely to the object under simultaneous oscillating or scanning motion at right angles thereto; that the radiation back-scattered from the object is collected at the same side of the body and is brought to form therefrom a signal which is compared with memory stored signals for the desired correct position of the object relative to the body for guidance of the radiation beam motion along the object and hence also the motion of the associated equipment. For obtaining the highest possible precision in the method it is preferred, that also the back-scattered radiation is collimated.

In accordance with the invention, a device for carrying out this method comprises a detecting device for determination of the position of an elongated and relatively narrow object relative to the surface of an obstructing body in front of said object and oriented at an angle thereto and, preferably an object of disk-like shape, by means of electromagnetic and preferably ionizing radiation for guidance of the movement of an associated treatment equipment, particularly for laser welding. The features substantially distinguishing said device are substantially that, the detecting device which is arranged at the same side of the disk-like body as the sender device, is adapted to receive a radiation emitted from the sender device towards the object and back-scattered from the object and to form therefrom a signal and in that a comparator is arranged to compare said signal with predetermined preference signals stored in a memory for the desired correct position of the object relative to the body for guidance of the movement of the radiation beam along the object and hence also the motion of the associated equipment.

By the inventive method and device it is now made possible, in a surprisingly effective manner, a rapid and effective operation with high precision in the function., such as in laser welding of double-curved and double-walled panels. In doing so the welding speed will be allowed to be as great as 1000 mm per minute.

Other features and advantages of the present invention will become apparent from the following description of the invention which refers to the accompanying drawings.

BRIEF DESCRIPTION OF THE DRAWINGS

The invention will be further described below with reference to the accompanying drawing in which:

FIG. 1 diagrammatically illustrates a first embodiment of a device according to the invention for carrying out the method;

FIGS. 2.1 and 2.2 illustrate examples of curves of the signals obtained from the detector means.

DETAILED DESCRIPTION OF THE PREFERRED EMBODIMENTS

Figure 3:
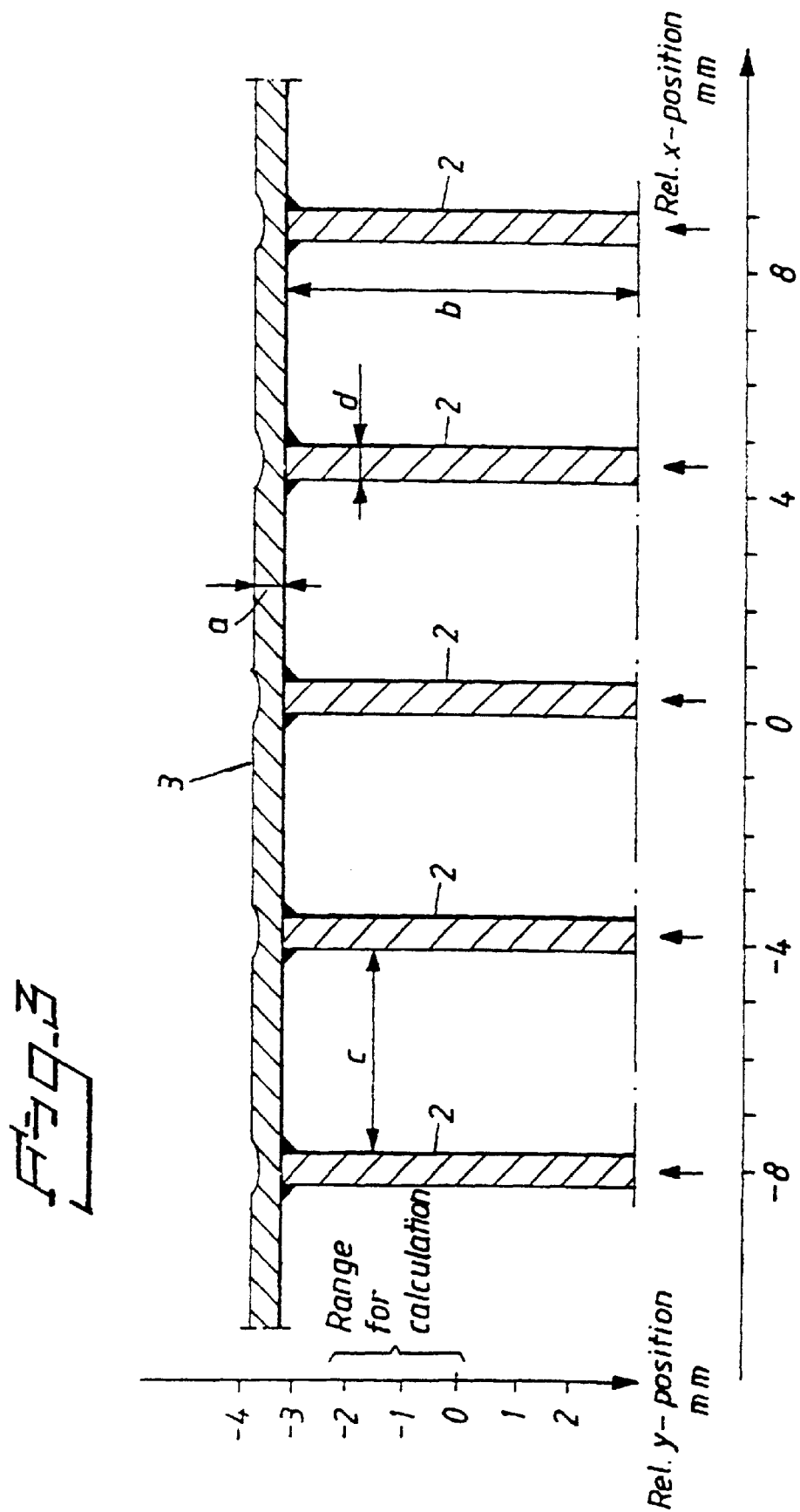
FIG. 3 illustrates a cross-section through a plurality of spacing walls which are to be welded with the inventive method to a piece of sheet metal.

As is evident from the drawings, the problem to be solved with the invention is that a first sheet metal piece or wall 1 which carries one or more parallel upright and thin spacing walls 2 is to be joined with an overlying wall or metal sheet 3 by welding. This is to be effected by a suitable welding equipment which is able to weld through said covering wall 3, and precisely follow the longitudinal extension of the spacing wall 2. This, however, causes very great difficulties since the wall 3 fully obstructs the viewing of the spacing wall 2 and the position thereof therefore has to be exactly determined without visual help.

According to the invention, as a solution to this problem, a detector unit 5 is used which houses a source 6 of electromagnetic radiation, particularly ionizing radiation. Preferably, said unit is mounted in a plane at right angles to the spacing wall 2 and at an angle of Φ/2 to the wall 3.

In combination with the radiation source 6 is arranged a detector means 7 which is mounted at an angle to the radiation source 6, preferably in an opposite angle of Φ/2 to the spacing wall 2 so that the position of interference between the radiation beam emitted from the source 6 and the observation zone of the detector means 7 will be located at a distance below the wall 3. If the detector device 5 then is carried to and from in the direction of the arrow A over the spacing wall 2 in a scanning motion, the radiation emitted from the source 6 will change in a characteristic manner when passing above the spacing wall 2 due to changes in the back-scattering of the radiation by the presence of a predetermined volume of material therein, in this case metal.

This circumstance is utilized for forming a signal from the detector means 7, which signal is carried to an electronic processing unit 10 only diagrammatically illustrated, and is compared therein by a comparator means, not illustrated, with predetermined preference signals, stored in a non-illustrated memory means for the desired correct position coordinates of the spacing wall 2 relative to the body 3. Depending on the result of this comparison, the electronic processing unit then creates a control signal which is carried to the non-illustrated treatment equipment to be controlled by said detector unit, particularly a laser welding equipment connected with the detector device 5. In this manner the equipment is caused to follow with precision said spacing wall 2 under the movement of the detector device 5 along the spacing wall 2 as well as an oscillating motion with small amplitude at right angles thereto.

The detector unit 5 can be made very sensible and to operate very exact with a precision of =0.1 millimeter, such that transport and welding speeds as high as up to 1,000 millimeters per minute are possible.

In the above-stated description it is a prerequisite that the radiation source 6 and the detector means 7 are arranged stationary within the unit 5 and that this unit 5 is brought to move in two directions x/y at right angles to each other in the plane of the body 3. To an artisan it is of course fully obvious that if desired the radiation source 6 instead might be stationary and the detector means 7 might be moved in a direction parallel to the direction of radiation. It is also possible, instead, to let the detector means 7 be stationary and to move the radiation source 6 parallel to the metal sheet 3 or, furthermore, with the source 6 stationary, utilize a detector means consisting of a row of detector elements. The radiation source 6 can be constituted by a plurality of sources. which all emit mutually parallel and slightly spaced radiation beams. In this case, the detector means can be constituted by a row of detector elements arranged adjacent each other. Alternatively, the radiation source 6 can provide a single beam and utilize at least two stationary detector means 7 arranged at different angles.

For determination of the spacing between the body or wall 3 and the edge surface of the spacing wall 2 to which the weld is to be made, the radiation source 6 together with the detector means 7 are caused to move to and from in the z-direction i.e. in a direction at right angles to the plane or the wall 3.

FIG. 2.1a) is a curve of the variation off the detector signal obtained at the passage of the detector means 7 of the spacing wail 2 when the same is at right angles to the wall 3, while FIG. 2.2b) illustrates the shape of the same signal should the spacing wall 2 not be located at right angles. In FIG. 2.2, the curves $c_1$, $c_2$ and $c_3$ illustrate three scanning operations, namely when at first no spacing wall 2 is present below the point of the detecting, and then when the radiation beam from the source 6 enters into the spacing wall 2 and finally when the beam lies entirely within said wall.

In FIG. 3, examples of relevant dimensions a–d of a plurality of spacing walls according to the following are shown, where:

0.4<a<1.2, 1.5<b<8, 2<c<8 and 0.4<d<1.2, all measurements in millimeters.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for determining the position of an elongated object relative to the surface of an obstructing body in front of said object and oriented at an angle thereto, using electromagnetic radiation, said method comprising:

directing from a side of the body remote from the object, under movement in the longitudinal direction of the object, at least one precisely collimated radiation beam obliquely to the object under simultaneous scanning motion at right angles thereto, collecting the radiation back-scattered from the object at the same side of the body to form a signal, and comparing the formed signal with memory-stored predetermined preference signals for the desired correct position of the object relative to the body for guidance of the radiation beam motion along the object.

2. A method according to claim 1, wherein the back-scattered radiation is collimated.

3. A device for carrying out the method according to claim 1, comprising:

a detector device for determination of the position of an elongated object relative to the surface of an obstructing body in front of said object and oriented at an angle thereto, which device comprises:

a sender device for directing electromagnetic radiation toward the object disposed on one side of the obstructing body;

a detector device which is located on the same side of the body as the sender device and which is adapted to receive a radiation back-scattered from the object and to form therefrom a signal; and comparator means adapted to compare said signal with predetermined preference signals for the desired correct position of the object relative the body stored in a memory means for guidance of the motion of the radiation beam along the object.

4. A device according to claim 3, further comprising a collimator for collimating the back-scattered radiation.

5. A device for carrying out the method according to claim 2, comprising:

a detector device for determination of the position of an elongated relative to the surface of an obstructing body in front of said object and oriented at an angle thereto, which device comprises:

a sender device for directing electromagnetic radiation toward the object disposed on one side of the obstructing body;

a detector device which is located on the same side of the body as the sender device and which is adapted to receive a radiation back-scattered from the object and to form therefrom a signal; and comparator means adapted to compare said signal with predetermined preference signals for the desired correct position of the object relative to the body stored in a memory means for guidance of the motion of the radiation beam along the object.

6. A device according to claim 5, further comprising a collimator for collimating the back-scattered radiation.

* * * * *